R. WHITE.
IRRIGATING DEVICE FOR PLANTS.
APPLICATION FILED FEB. 2, 1916.
1,216,642.
Patented Feb. 20, 1917.
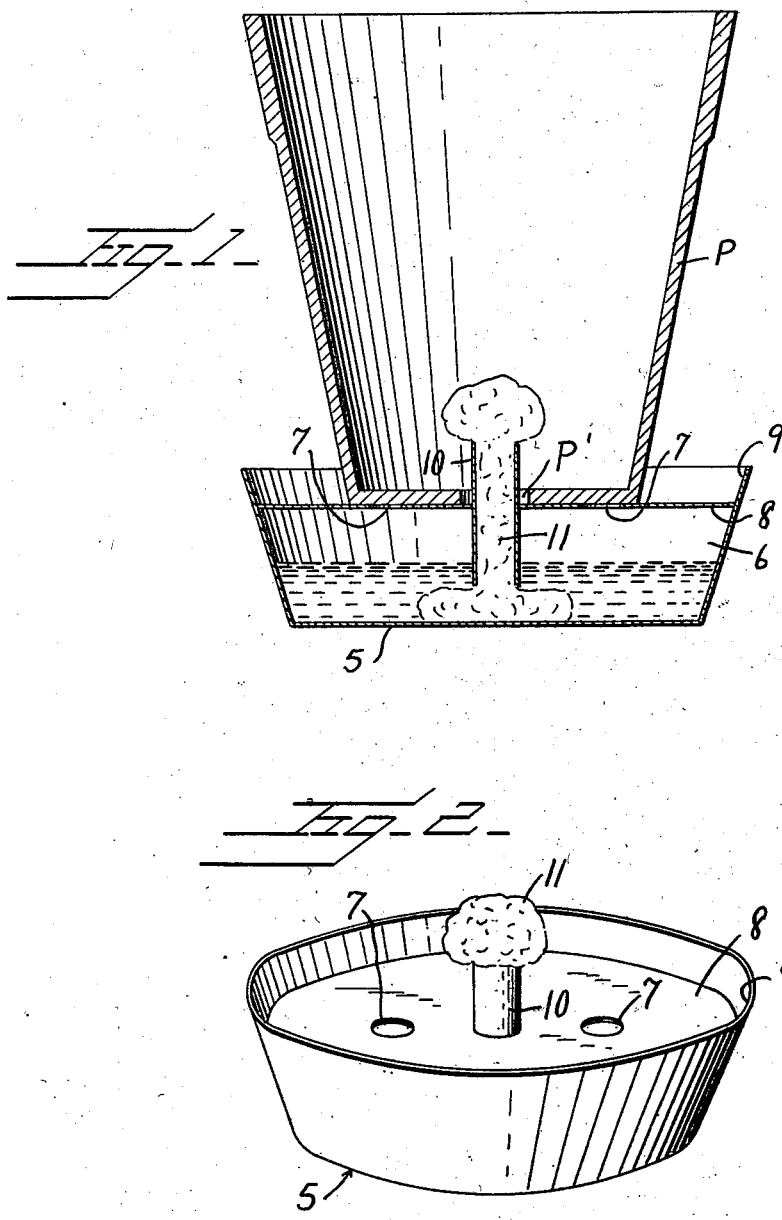
Inventor
ROY WHITE
By Watson E. Coleman
Attorney

UNITED STATES PATENT OFFICE.

ROY WHITE, OF LAMAR, COLORADO.

IRRIGATING DEVICE FOR PLANTS.

1,216,642.  Specification of Letters Patent.  Patented Feb. 20, 1917.

Application filed February 2, 1916. Serial No. 75,796.

*To all whom it may concern:*

Be it known that I, ROY WHITE, a citizen of the United States, residing at Lamar, in the county of Prowers and State of Colorado, have invented certain new and useful Improvements in Irrigating Devices for Plants, of which the following is a specification, reference being had to the accompanying drawings.

This invention relates to an improved irrigating device for plants and has for its primary object to provide means whereby moisture is automatically supplied to the earth in a flower pot surrounding the roots of the plants by capillary attraction.

It is another and more particular object of the invention to provide a base having a water chamber and openings in the top wall of the base, whereby the water supply may be replenished, a central tube fixed in the top wall of the base, and absorbent means extending through said tube into the water and upwardly into the flower pot supported upon the base.

It is an additional object of the invention to provide a device for the above purpose, which is exceedingly simple and inexpensive in its construction and will efficiently perform the functions for which the same is devised.

With the above and other objects in view, my invention consists in the novel features of construction, combination and arrangement of parts to be hereinafter more fully described, claimed and illustrated in the accompanying drawing, in which, Figure 1 is a vertical sectional view illustrating the preferred embodiment of my improved irrigating device; and Fig. 2 is a perspective view of the device.

Referring in detail to the drawing, 5 designates a base for a flower pot or like holder for plants, said base being in the form of a closed receptacle having a water chamber 6 and one or more openings 7 in the top wall of said chamber through which the supply of water may be replenished. The annular body wall of said chamber tapers from top to bottom and extends above the top wall 8 of the chamber to provide an annular flange 9, whereby moisture collecting upon said top wall will be retained.

P designates a flower pot having a suitable capacity, which is adapted to be arranged upon the top wall 8 of the base and over the opening 7 therein. This flower pot is provided in its bottom wall with the usual central opening P'.

A vertical tube 10 is fixed intermediate of its ends centrally in the top wall 8 and projects above and below said wall. The lower end of this tube is spaced from the bottom wall of the water chamber and the upwardly projecting portion of the tube is adapted to extend through the opening P' in the bottom wall of the flower pot and into the earth within said pot. 11 designates a length of sponge or other absorbent material extending through the tube 10 and below the same into the water in the chamber 6. This sponge also projects outwardly from the upper end of the tube 10 in the flower pot.

In the practical operation of the device, it will be readily understood that the water is absorbed by the sponge and, by capillary attraction, drawn upwardly and disseminated through the earth in the bottom of the pot and around the plant roots. In this manner, the moisture is automatically and continuously supplied to the plant so as to facilitate the growth thereof. Any excess of water will drain through the opening P' in the bottom wall of the pot and collect upon the top wall 8, the flange 9 holding the water and preventing the same from escaping over the outer edge of the pot support.

From the foregoing description, taken in connection with the accompanying drawing, it is believed that the construction, manner of operation and several advantages of the invention will be clearly and fully understood. The device, while exceedingly simple, is very convenient and serviceable in practical use and highly reliable for the purposes in view. It is manifest, of course, that the device can be constructed in various sizes and shapes and of sheet metal, clay, or other material.

While I have shown and described the preferred construction and arrangement of the several parts, it is to be understood that the device is susceptible of considerable modification therein, and I, therefore, reserve the privilege of adopting all such legitimate changes as may be fairly embodied within the spirit and scope of the invention as claimed.

Having thus fully described my invention, what I desire to claim and secure by Letters Patent is:—

An irrigating device for plants including a pot supporting base having a water chamber and supply openings in the top wall thereof adapted to be closed by a pot arranged upon said base, a vertical tube centrally fixed in the top wall of the base extending above and below the same, the upper end portion of the tube extending through an opening in the bottom wall of the pot and the lower end thereof being spaced from the bottom wall of said chamber, the annular body wall of said support projecting above the top wall thereof to provide an annular guard flange whereby water collecting upon the surface of the top wall is retained thereon, and a length of absorbent material extending through said tube and into the water chamber and above the upper end of the tube into the pot.

In testimony whereof I hereunto affix my signature in the presence of two witnesses.

ROY WHITE.

Witnesses:
   CHARLES L. DOUGHTY,
   NELLIE RYBURN.